March 25, 1941.
G. W. WATTS
2,236,048
DEEP FAT COOKER
Filed Dec. 30, 1939
2 Sheets-Sheet 1
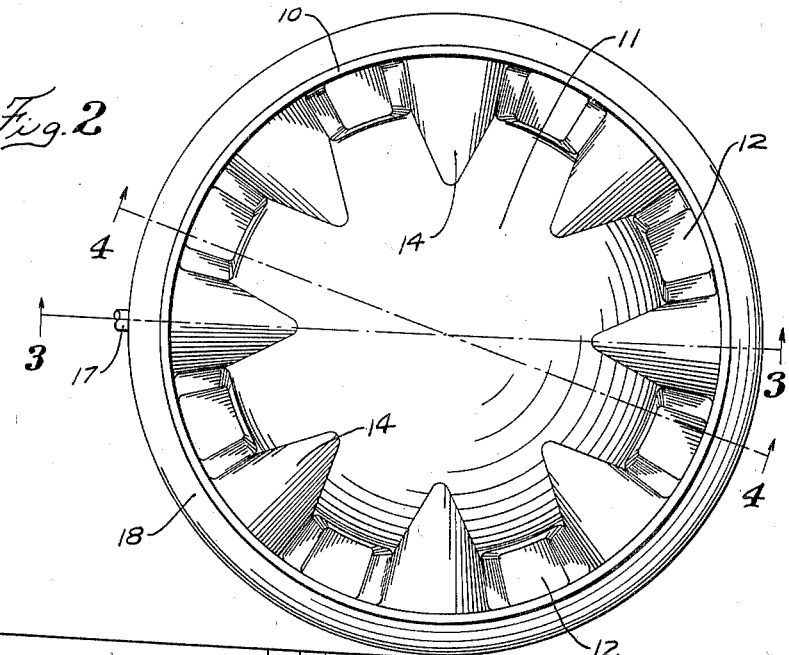
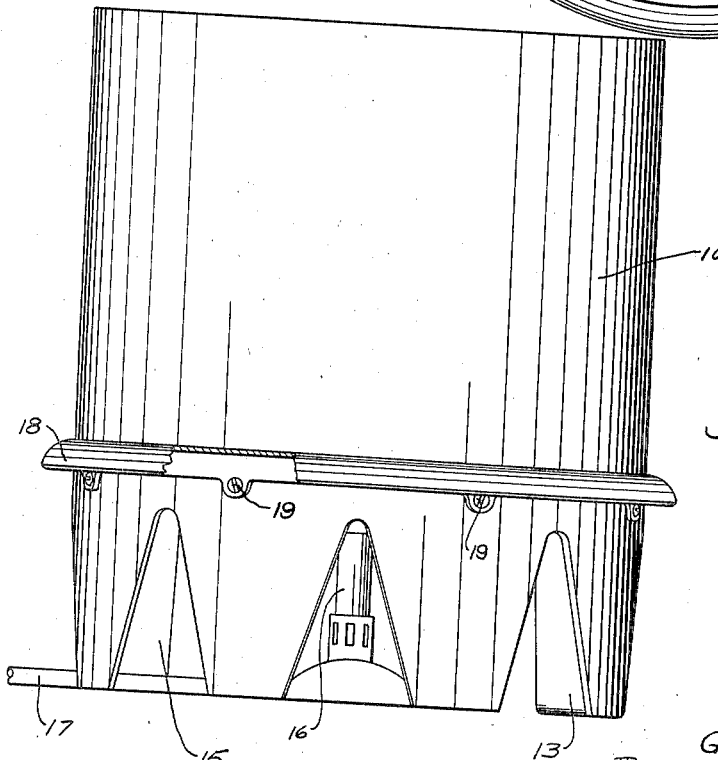
INVENTOR
GEORGE W. WATTS,
By Minturn & Minturn
ATTORNEYS March 25, 1941.　　　G. W. WATTS　　　2,236,048
DEEP FAT COOKER
Filed Dec. 30, 1939　　　2 Sheets-Sheet 2

INVENTOR
GEORGE W. WATTS,
BY Minturn & Minturn
ATTORNEYS

Patented Mar. 25, 1941

2,236,048

UNITED STATES PATENT OFFICE 2,236,048

DEEP FAT COOKER

George W. Watts, Indianapolis, Ind.

Application December 30, 1939, Serial No. 311,779

1 Claim. (Cl. 53—7)

This invention relates to means for deep fat frying and particularly to a unitary kettle of unique design which may be used in conjunction with any standard type of heater or burner readily obtained upon the market without having to install any special plumbing or the like.

A further important object of the invention is to provide a kettle base of such formation that the heat of the burner will be most efficiently employed and at the same time a plurality of receptacles will be provided below the intensely heated zone of the fat into which receptacles the crumbs leaving the materials being fried may be directed and may accumulate without convection currents in or other disturbances of the fat otherwise causing the crumbs to return to the cooking zone.

Figure 3:
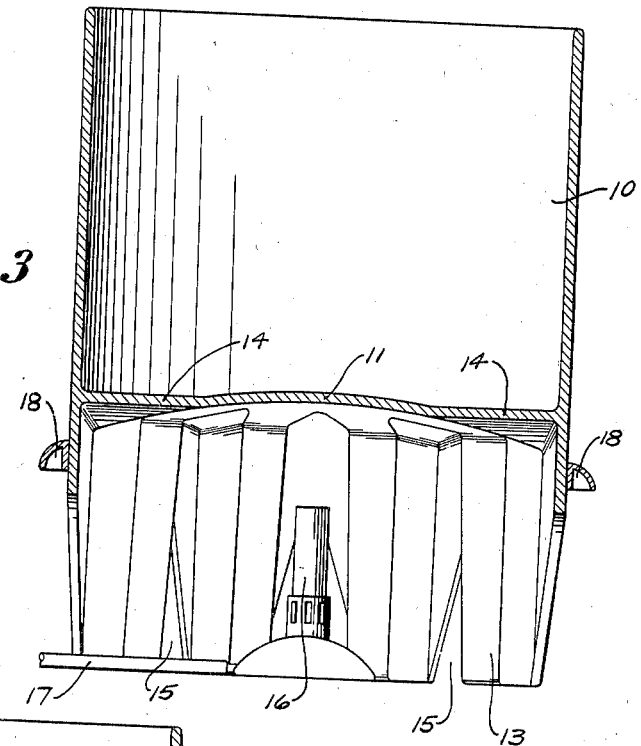

These and other important objects and advantages of the invention will become apparent to those versed in the art in the following description of one particular form of the invention as illustrated in the accompanying drawings, in which Fig. 1 is a side elevation of a structure embodying the invention;

Fig. 2, a top plan view;

Fig. 3, a central, vertical section on the line 3—3 in Fig. 2; and

Figure 4:
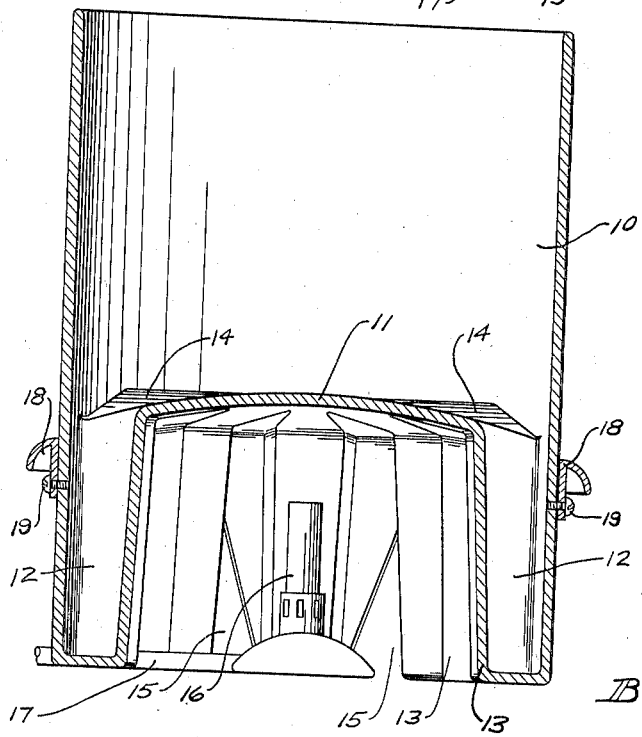

Fig. 4, a central, vertical section on the line 4—4 in Fig. 2.

Like characters of reference indicate like parts throughout the several views in the drawings.

I form a vessel 10 generally cylindrical in shape out of any suitable material, preferably aluminum which not only is a good conductor of heat but also may be readily polished to give a smooth and pleasing appearance. The vessel 10 is provided with a domed shaped floor 11 spaced considerably, that is, more than a fourth of the depth of the vessel above the floor of the vessel which is interrupted circumferentially therearound adjacent the vertical wall of the vessel 10 by a plurality of pockets or wells 12, herein shown as eight in number, although the exact number is not critical. These pockets 12 are within legs 13, the outer walls of which are downward extensions of the circumferential wall of the vessel 10. As indicated in Figs. 3 and 4, the depth of these pockets 12 is considerable in proportion ot the depth of the vessel 10 above the floor 11 due to the elevation of the floor as best indicated in Fig. 4.

Between adjacent pockets 12 are ridge-like extensions 14 from the floor 11 to the circumferential vertical wall of the vessel 10, these extensions 14 being arched circumferentially so as to slope downwardly from an upper central portion toward the pockets appearing on each side thereof. It is to be noted also, Fig. 2, that these extensions 14 rise from the outer circumferential part of the floor 11 and continue substantially horizontally on across to the wall of the vessel 10, Fig. 3.

The outer wall of the vessel 10 not only extends circumferentially around to form the outer closure wall of each of the legs 13 but also extends therebeyond between adjacent legs to leave an inverted V-like opening 15 in each instance, as best shown in Fig. 1. These openings 15 serve as air admission openings or ports to support combustion where gas or the like is employed as a fuel under the floor 11.

In the present showing, a gas burner 16 is indicated as being centrally positioned under the floor 11 within the surrounding legs 13. A tube or pipe 17 may be passed through any one of the openings 15 to convey the gas to the burner. Of course, it is obvious that a plurality of burners or even a different type of burner may be employed since the construction of the burner itself does not involve invention in the present instance.

As a factor of safety, a drip ring 18 is formed to slide over the vessel 10 and be secured with a close fit thereagainst above the tops of the openings 15 so that should any of the fat flow over and down the outside of the wall of the vessel 10, it will be directed outwardly to drop from the outwardly flaring flange of this ring 18 to fall in spaced relation from the lower part of the wall of the vessel 10 and not flow directly to or around the upper ends of the openings 15. In other words the outwardly flaring part of the ring 18 directs such overflowing fat sufficiently far from these openings as to prevent ignition from heat escaping through those openings.

In the form herein shown the ring 18 is attached to the vessel 10 by means of a plurality of screws 19 passing through the inner downturned leg of the ring and screw-threadedly engaging in the wall of the vessel 10. From the top of this downturned leg, the ring flares outwardly and downwardly as best indicated in Fig. 4.

While I have herein shown and described my invention in the one best form as now known to me, it is obvious that structural changes may be employed without departing from the spirit of the invention and I, therefore, do not desire to be limited to that precise form beyond the limitations as may be imposed by the following claim.

I claim:

In a deep fat cooker, a vessel, a centrally convexly curved floor in the vessel, a plurality of hollow legs extending below said floor, circumferentially therearound to have the vessel wall continue downwardly to form the outer wall of each leg, said legs having top openings therein through said floor adjacent the vessel wall, said floor sloping outwardly and downwardly to said opennigs, and said vessel wall having openings therethrough between said legs and under said floor, said legs defining in effect a heating chamber, the top of which is said floor, and arched extensions of said floor between said wall and said leg openings, said side wall openings being below said extensions respectively.

GEORGE W. WATTS.